(12) United States Patent
Feng

(10) Patent No.: US 11,412,449 B2
(45) Date of Patent: Aug. 9, 2022

(54) COMMUNICATING IN A WIRELESS NETWORK

(71) Applicant: SIGNIFY HOLDING B.V., Eindhoven (NL)

(72) Inventor: Lei Feng, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/282,124

(22) PCT Filed: Oct. 7, 2019

(86) PCT No.: PCT/EP2019/077010
§ 371 (c)(1),
(2) Date: Apr. 1, 2021

(87) PCT Pub. No.: WO2020/074407
PCT Pub. Date: Apr. 16, 2020

(65) Prior Publication Data
US 2021/0377855 A1     Dec. 2, 2021

(30) Foreign Application Priority Data

Oct. 11, 2018   (WO) ................ PCT/CN2018/109841
Dec. 18, 2018   (EP) ..................................... 18213296

(51) Int. Cl.
*H04W 52/02*            (2009.01)

(52) U.S. Cl.
CPC ............................ *H04W 52/0216* (2013.01)

(58) Field of Classification Search
CPC ..................... H04W 52/0216; H04W 52/0212
See application file for complete search history.

(56) References Cited

U.S. PATENT DOCUMENTS

| 2008/0261663 A1 | 10/2008 | Park et al. |
| 2013/0142268 A1 | 6/2013 | Gao et al. |
| 2017/0127403 A1 | 5/2017 | Sapio et al. |
| 2017/0142675 A1* | 5/2017 | Ljung .................. H04W 76/25 |

FOREIGN PATENT DOCUMENTS

| CN | 102724014 B | 11/2016 | |
| CN | 108965063 A | 12/2018 | |
| EP | 1450521 A2 | 8/2004 | |
| WO | WO-2012042454 A1 * | 4/2012 | ........... H04L 1/1848 |

* cited by examiner

*Primary Examiner* — Keith Ferguson

(57) ABSTRACT

Systems for communicating with a target node, e.g. a particular device, of a wireless network. In particular, there is a concept of accurately identifying a timeout period during which the target node is expected to acknowledge the communication. There is a dynamic timeout period, the length of which is based upon one or more characteristics of at least one most recent or previous communication from the target node.

15 Claims, 4 Drawing Sheets

COMMUNICATING IN A WIRELESS NETWORK

CROSS-REFERENCE TO PRIOR APPLICATIONS

This application is the U.S. National Phase application under 35 U.S.C. § 371 of International Application No. PCT/EP2019/077010, filed on Oct. 7, 2019, which claims the benefits of European Patent Application No. 18213296.9, filed on Dec. 18, 2018 and Chinese Patent Application No. PCT/CN2018/109841, filed on Oct. 11, 2018. These applications are hereby incorporated by reference herein.

FIELD OF THE INVENTION

The invention relates to the field of wireless communication technology, and in particular to methods of communicating between nodes of networks with a low data transmission rate.

BACKGROUND OF THE INVENTION

Wireless networks are becoming increasingly common in everyday life, for example, to implement the internet-of-things. Wireless networks with low data transmission rates are also of particular interest, to minimize cost and energy consumption and to extend radio coverage. One example of a low data transmission rate network is a Low-Power Wide Area Network (LPWAN), although other examples are known.

A Low-Power Wide-Area Network (LPWAN) has been proposed to fill a technological gap that exists between the well-known technologies of wireless sensor networks and high throughput wide area networks. A LPWAN is a wireless Wide-Area network technology specialized for interconnecting devices with only a low bit-rate communication capability, over a wide area and with low cost. Typically, a LPWAN is used for battery powered devices, resource-restricted units, or power-harvesting devices, such as solar-powered devices.

Popular LPWAN technologies include, for cellular applications, the NarrowBand IoT (NB-IoT) radio technology standard or the enhanced Machine Type Communications (eMTC) protocol. Another popular LPWAN technology is LoRaWAN.

There has been a growing interest in using LPWAN technology in new industries, especially the automotive, utility (e.g. lighting or water), agricultural and health industries. In these applications, end nodes of a LPWAN consist of peripheral input and/or output devices, and may include, for example, water meters, gas detectors, car monitoring systems, personal healthcare monitoring products and/or wireless luminaires. Typically, end nodes are unable to route received information to other devices in the LPWAN.

In LPWANs, there has been a growing trend in reducing the power consumption of the nodes of the LWPAN, and especially end nodes, e.g. to improve a battery life and minimize traffic.

SUMMARY OF THE INVENTION

The invention is defined by the claims.

According to examples in accordance with an aspect of the invention, there is provided a method of communicating with a target node of a wireless network. The method comprises receiving a first uplink message sent by the target node and subsequently sending a downlink message to the target node. The method further comprises calculating a minimum timeout period using at least one characteristic of the at least one first uplink message, the minimum timeout period representing a minimum length of time following the sending of the downlink message during which the target node is expected to respond with a response uplink message. The method further comprises determining a timeout period based on the minimum timeout period. The method also comprises determining whether the target node has responded to the downlink message with a response uplink message within the timeout period following the sending of the downlink message.

Thus, a minimum length of a timeout period for receiving a response message, indicating that a target node of the wireless network has acknowledged or otherwise received a downlink message, is determined based on at least one characteristic of one or more previous uplink messages ("first uplink messages") sent by the target node. The first uplink message(s) is received prior to the issuance of the downlink message. In some embodiments, if a response uplink message is not received within the timeout period, the downlink message can be resent.

In other words, a dynamic timeout period for receiving a response uplink message from a target node can be set based on one or more characteristics of at least one uplink message recently sent by the target node, preferably including at least a most recent uplink message sent by the target node.

The present invention relies on the understanding that the communicative ability operation of the target node may be restricted or limited (e.g. limited bandwidth, limited duty cycle and so on). Thus, after issuance of a first uplink message or messages, a target node may be unable to send a further message, e.g. a response uplink message, until a particular period of time (the "recovery period") has passed. Thus, if a timeout period for resending of a downlink message to the target node ends during the period of time during which a target node is unable to respond (i.e. during the "recovery period"), then it may be incorrectly assumed (e.g. by an observer or a sender of the downlink message) that the target node has not successfully received the downlink message. This could lead to communicative confusion and/or delay. By way of example, a downlink message could be unnecessarily resent (as the target node may have successfully received the downlink message, but been unable to acknowledge it).

The present invention therefore proposes to set a length of the timeout period to be based on one or more characteristics of the one or more first uplink message(s), preferably including at least a most recent first uplink message sent by the target node. It has been recognized that characteristics of the first uplink message or messages contain information about the recovery period (or can be used to calculate the recovery period).

This avoids a timeout period being incorrectly set, which could result in an (incorrect) assumption that the target node has not received the downlink message. This assumption may be incorrect, because it may be the case that the target node has been simply unable to acknowledge the downlink message due to communicative restrictions.

By way of example only, embodiments may avoid unnecessary reissuance of a downlink message, minimizing traffic on the wireless network and reducing power consumption whilst also avoiding unnecessarily long timeouts (e.g. a timeout which would account for all situations), which would slow down communication times.

A maximum timeout period may also be determined in a similar manner.

Preferably, the at least one characteristic of the one or more first uplink messages comprise metadata of the one or more first uplink message. In particular, the at least one characteristic may include one or more: timing information of the first uplink message(s), a data size of the first uplink message(s), a transmission time of the first uplink message(s) and so on.

Preferably, the target node is an end node of a wireless network. In some embodiments, the downlink message is a command (e.g. for the target node to perform a particular action). Commands typically instigate a response uplink message, such as an acknowledgment, to be issued by the target node.

It will be appreciated that the precise characteristics of the first uplink message used to determine the minimum length of the timeout period may differ according to different implementation details (e.g. different target nodes or different wireless network systems may employ different schemes for operating a target node).

Preferably, the minimum timeout period is calculated using timing information and/or a data size of the first uplink message. Thus, the at least one characteristic of the first uplink message(s) used to calculate the minimum timeout period may comprise timing information and/or a data size of the first uplink message.

Timing information may include, for example, a (predicted) time at which the first uplink message is sent by the target node, a time at which the first uplink message is received, a length of time taken to send uplink information and so on. Preferably, the timing information comprises a timestamp indicating a particular point in time.

The present invention recognizes that, in some examples, a target node may only be capable of sending uplink messages at certain time intervals, e.g. it may be restricted to sending uplink messages periodically in order to save power. Thus, by using timing information of the first uplink message in order to calculate the timeout period, the timing capabilities of the target node can be taken into account.

A data size may, for example, indicate a size in bits or bytes of the first uplink message.

It is also recognized that a target node may be limited in the amount of data it is able to send over a period of time, e.g. in order to minimize power. This may be taken into account by setting the minimum length of the timeout period based on the data size of a previous uplink message (to take account of a recovery period of the target node to be able to send the uplink message).

Of course, particularly advantageous embodiment use both timing information and a data size of the first uplink message in order to set the minimum timeout period. For example, a target node may be restricted to sending a certain amount of data within a predetermined time period (e.g. limited duty cycle). Thus, a more accurate determination of when the target node is able to send a response uplink message (i.e. defining the timeout period) may be determined by using both timing information and a data size of the first uplink message.

The minimum timeout period may be calculated (further) using timing information of the downlink message.

Setting the minimum timeout period further based on timing information of the downlink message enables a length of the timeout period that has already lapsed or how long the timeout period is expected to last from the time of sending the downlink message.

For example, it may be known that a target node is only able to send messages every minute (e.g. 12:01; then 12:02 etc.). By basing the minimum timeout period on the timing information of the downlink message, it is possible to more accurately identify the predicted time at which the target node is able to send the response uplink message, and therefore more accurately identify an appropriate length for the timeout period.

Preferably, timing information of both the first uplink message and the downlink message is used to determine the minimum timeout period. By way of example, the length of the timeout period may be based on a difference between a time at which the first uplink message is sent/received and a time at which the downlink message is sent. This enables an accurate determination of precisely when the target node is able to send the response uplink message (i.e. with respect to a time at which the downlink message was sent).

Timing information of the downlink message may include, for example, a time at which the downlink message is sent, a (predicted) time at which the downlink message is received by the target node, a length of time taken to send downlink information and so on.

The minimum timeout period may be (further) based upon at least a data transmission rate and/or a maximum allowable duty cycle of the wireless network.

In other words, characteristics of the wireless network may define the length of the timeout period. In particular, the wireless network may restrict a communication capability of the target node, so that the target node is unable to send the response uplink message until a certain period of time after sending the first uplink message (the "recovery period").

Thus, by basing the minimum timeout period on such characteristics of the wireless network, a time at which the target node is able to send the response uplink message (i.e. and thus the timeout period) can be more accurately identified.

A data transmission rate and/or maximum allowable duty cycle are particular examples of characteristics of the wireless network that may restrict a communicative capability of the target node, and therefore provide suitable measurements for establishing the timeout period.

The method may further comprise a step of calculating the minimum timeout period based on at least one characteristic of the first uplink message(s) sent by the target node. Thus, the minimum timeout period may be actively calculated.

The step of calculating the minimum timeout period may comprise: determining a length of a recovery period, following the first uplink message, during which the target node is not permitted to issue a subsequent uplink message in accordance with an operating practice; determining the minimum timeout period based on the length of the recovery period.

It is therefore proposed to determine a length of time (the "recovery period") taken by the target node to recover from the sending the first uplink message before it is able to send a subsequent uplink message, e.g. the response uplink message. The recovery period therefore represents a period of time, since sending the first uplink message, that the target node is unable to send a further message. Thus, the recovery period may represent a length of time after the first uplink message until the target is able to send the response uplink message.

The length of the recovery period may vary depending upon a number of factors, but is typically reliant on an operating practice of the wireless network and/or target node.

Optionally, the step of determining the minimum timeout period comprises: determining the length of an offset time period, being the length of time between the sending of first uplink message and the sending of the downlink message; determining the minimum timeout period based on the offset time period and the recovery period.

This embodiment enables the minimum timeout period to be set further based on a length of time between sending of the first uplink message and the sending of the downlink message, i.e. the "offset time period".

Thus, a period between the length of time between sending the first uplink message and the sending of the downlink message may be taken into account when calculating the minimum timeout period. In particular, any of the recovery period that has already elapsed ("expired period") before sending of the downlink message may be taken into account. Thus, embodiments may subtract the offset time period from the recovery period, and determiner the minimum timeout period based the resulting value. This reduces the length of the minimum timeout period, thereby further improving a communicative speed of the wireless network.

In yet other examples, the minimum timeout period may be set to no less than the length of the recovery period. This may be performed for the sake of processing efficiency, and to increase a margin for the timeout period (e.g. to minimize a risk of missing the uplink response message).

In some examples, the step of determining a length of a recovery period comprises: determining a data size of the first uplink message(s); determining a data transmission rate of the wireless network; determining a maximum allowable duty cycle of the wireless network according to the operating practice; and determining the length of the recovery period based on the data size of the first uplink message, the data transmission rate of the wireless network and the maximum allowable duty cycle of the wireless network.

Preferably, the step of determining the length of the recovery period comprises: determining the transmission time of the first uplink message(s), being the length of time taken by the target node to send the first uplink message(s), based on the size of the first uplink message(s) and the data transmission rate; and calculating the length of the recovery period based on the transmission time of the first uplink message(s) and the maximum allowable duty cycle.

Thus, a method may comprise determining how long it takes ("transmission time") for the first uplink message(s) to be communicated over the wireless network. The transmission time, together with the maximum allowable duty cycle, can indicate a length of a recovery period before the target node is able to communicate again.

This enables an accurate assessment of the length of the recovery period (which adheres to an operating practice), and thereby enables the timeout period to be calculated based on the operating practice. A more accurate timeout period can therefore be obtained.

In some examples, the minimum timeout period is further based on a minimum round-trip time representing a minimum length of time taken, subsequent to the sending of a downlink message, to receive a response uplink message.

By way of example, the minimum timeout period may be based on the normal or standard round-trip, representing a length of time taken for a typical downlink and response uplink cycle to occur. Thus, the round-trip time may represent a length of time taken (after sending of the downlink message) for the downlink message to pass to the target node through the wireless network, for the target node to process and (immediately) respond to the downlink message, and for the response uplink message to return through the wireless network (i.e. a "normal round-trip time"). The round-trip time is independent of a length of time for which the target node is unable to send communications (e.g. due to operating practices), i.e. independent of the recovery period.

In particular embodiments, an absolute minimum value for the length of the timeout period may be the round-trip time, so that the minimum timeout period can be no less than the round-trip time. This ensures that the minimum timeout period takes into account communicative delay (e.g. wireless network delay), reducing the likelihood that a downlink message will be unnecessarily resent.

In some embodiments, the minimum timeout period is set to be the greater of the recovery period and the round-trip time previously described.

The method may further comprise, in response to receiving a second uplink message, different to the response uplink message, from the target node after sending the downlink message and before receiving the response uplink message, recalculating the minimum timeout period using at least one characteristic of the second uplink message.

Thus, the timeout period may be recalculated when a new uplink message ("second uplink message") is received after sending of the downlink message. Such an embodiment recognizes that a message flow may involve numerous network elements (e.g. routers, gateways, message buffers etc.), which may mean that there is a delay after the target node sends the second uplink message. This delay could result in the downlink message being sent after the target node has sent the second uplink message, but before receiving the second uplink message.

The second uplink message may result in the target node being unable to communicate for an additional period of time (i.e. beyond the timeout period calculated based on the first uplink message(s)). Thus, embodiments may comprise recalculating the timeout period based on one or more characteristics of the second uplink message. Any described method for calculating the timeout period based on one or more characteristics of the first uplink message(s) may be adapted for recalculating the timeout period based on the second uplink message, mutatis mutandis.

The timeout period may be set to the determined minimum timeout period. In other examples, the timeout period may be set to the sum of a determined minimum timeout period and an additional period (e.g. accounting for communicative delay through the wireless network).

There is also proposed a computer program comprising code means for implementing any previously described claim when said program is run on a computer.

According to examples in accordance with an aspect of the invention, there is provided a communication unit for communicating with a target node of a wireless network. The communication unit comprises a transceiver adapted to send signals to and receive signals from the target node. The communication also comprises a processor adapted to communicate with the transceiver in order to: receive a first uplink message(s) sent by the target node; subsequently send a downlink message to the target node; determine whether the target node has responded to the downlink message with a response uplink message within a timeout period following the sending of the downlink message; and in response to the target node failing to respond to the downlink message with a response uplink message within the timeout period, resend the downlink message to the target node, wherein the timeout period is no less than a minimum timeout period calculated using at least one characteristic of the first uplink message(s) sent by the target node.

The minimum timeout period may be calculated using timing information and/or a data size of the first uplink message.

There is also proposed a network system comprising: the communication unit herein described; and at least one target node adapted to: send the first uplink message to the communication unit; receive the downlink message from the communication unit; send a response uplink message to the communication unit in response to the downlink message, wherein the timing of sending the response uplink message to the communication unit is based on at least one characteristics of the first uplink message(s).

The network system preferably operates using an LPWAN technology standard.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
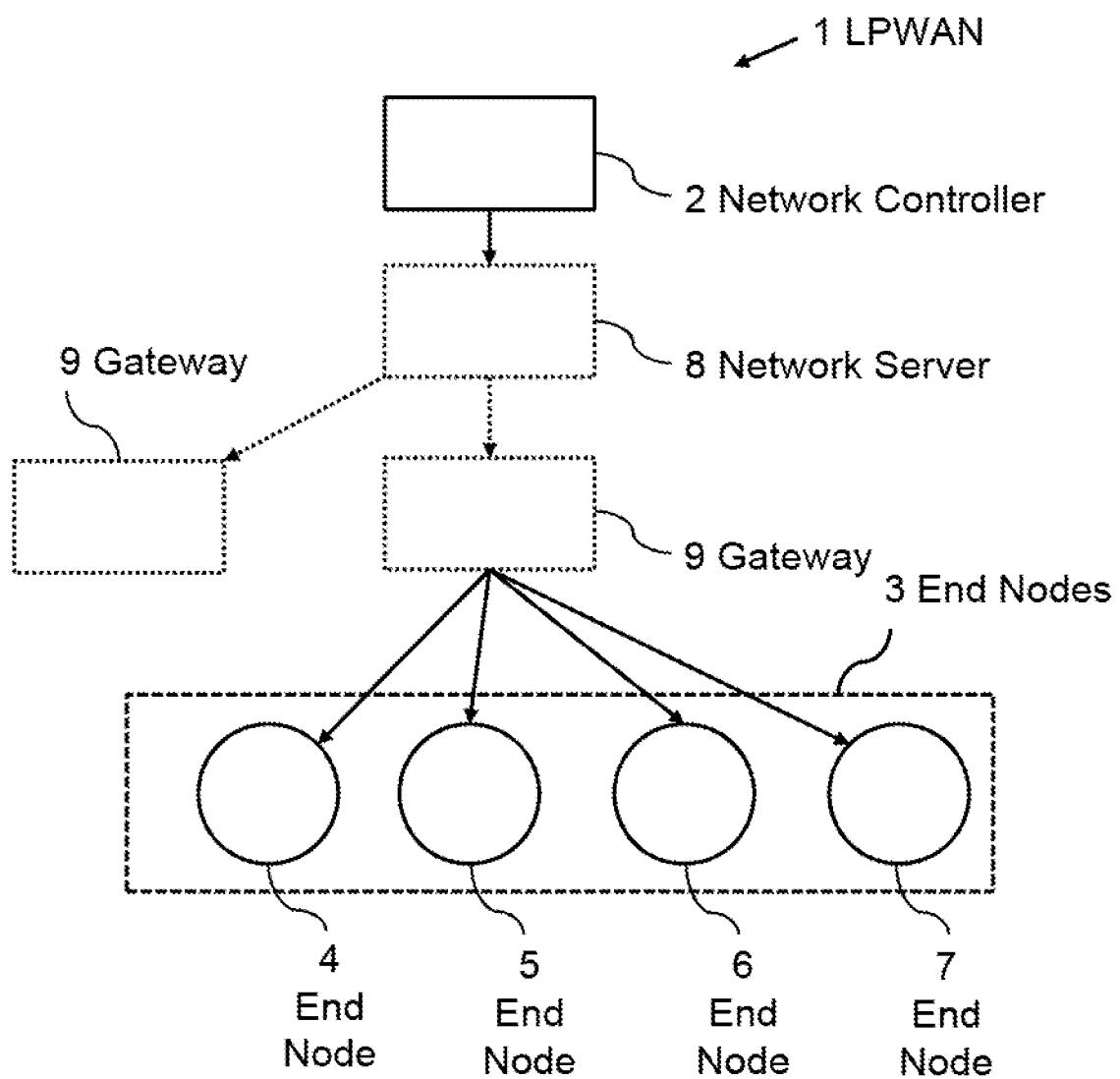
FIG. 1 illustrates an example of a Low-Power Wide-Area Network.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

According to a concept of the invention, there is proposed a method and corresponding apparatus for communicating with a target node (e.g. a particular device) of a wireless network. In particular, there is a concept of more accurately identifying a timeout period during which the target node is expected to acknowledge a communication. The invention relies on a concept of providing a dynamic timeout period, the length of which is based upon one or more characteristics of at least one most recent or previous communication from the target node.

Embodiments are at least partly based on the realization that the ability of a target node to respond to an external communication may be reflected in characteristics of one or more previous communications sent by that target node. In particular, the length of a recovery period, being a period after sending a most recent communication during which the target node is unable to send further communications, can be represented by characteristics of the communication or communications immediately preceding the recovery period.

Illustrative embodiments may, for example, be employed in Low-Power Wide-Area Networks, and in particular to communicating with target nodes of Low-Power Wide-Area Networks that employ power saving practices or use particular operating practices (such as limited duty cycles, periodic communications and so on). However, embodiments may be advantageously used in any wireless network for which a target node has a restricted communication capability (e.g. a low data transmission rate and/or restricted duty cycle).

The term "transmission time" (or "time-on-air") refers to a length of time that a communication takes to transmit over the wireless network to a destination. The transmission time can be calculated using a data size of the communication and a data transmission rate (i.e. bandwidth) of the network.

The term "duty cycle" refers to the proportion of time during which a node or device sends communications over the wireless network. For example, if within a 100 second period a device sends only a single message taking 1s to transmit over the network, then the duty cycle of that device is 1%.

The term "restricted duty cycle" or "limited duty cycle" refers to the maximum allowable duty cycle for a given node or device. Such restrictions may be applied by operating practices, communication standards and so on. For example, if a target node has a restricted duty cycle of 1%, it is only able to send communications 1% of the time (e.g. for a total of 36 seconds in a 1 hour period).

If a node/device has a restricted duty cycle, this restriction may be applied dynamically, over a moving window of time or within fixed periodic intervals of time.

In a "dynamic restriction" mode, after sending a single communication, a device may be unable to send a further communication until the duty cycle restriction/condition is met. For example, if a device following a dynamic restriction mode takes 1 second to send a communication, and has a restricted duty cycle of 1%, then it will be unable to send a further communication for 99 seconds.

In a "moving window restriction" mode, the device may have a restricted duty cycle within a moving window of a predetermined length. This would mean that there is a maximum combined transmission time for all messages sent by the device within any given window of the predetermined length (i.e. in a time period of the predetermined length beginning at any given point in time). For example, if a device (operating in a moving window restriction mode) has a restricted duty cycle of 1% with a time window of 1 hour, that device would be unable to send a desired communication that would cause the device to send more than 36 seconds of communications within an immediately preceding 1 hour period—rather the device must wait until sending of the desired communication would not cause the device to send more than 36 seconds of communication with an immediately preceding 1 hour period.

In a "periodic intervals restriction" mode, the device may have a maximum length of time (e.g. 36 seconds) for communicating within fixed periodic intervals of a predetermined length (e.g. 1 hour). For example, the device (operating in the "periodic intervals restriction" mode) may cumulatively count a time spent sending communications, and prevent further communications after a predetermined length of time (e.g. 36 seconds) is spent sending communications. The cumulative count can then be reset at periodic intervals (e.g. every hour) to thereby enable communications to be sent again.

Precise restrictions on a duty cycle of a device, and how to implement a restricted duty cycle, may differ between in different implementations (e.g. different devices, different networks, different operating practices and/or different communication standards). Thus, there may be different modes or method of restricting a duty cycle of a node or device.

FIG. 1 illustrates a Low-Power Wide-Area Network (LPWAN) 1, an example of a wireless network, and is illustrated to provide context for embodiments of the invention. Other wireless networks may also employ the concepts described in this description and be formed with a similar architecture.

The illustrated LPWAN 1 comprises a network controller 2, and a plurality 3 of end nodes 4, 5, 6, 7. Each end node, including the first end node, is managed by the network controller 2.

The network controller 2, alternatively named a server, communicates with the end nodes 4, 5, 6, 7 over a wireless communication channel using a LPWAN communication protocol. In some embodiments, the network controller communicates with the end nodes via intermediary devices, such as a network server 8 and/or gateways 9. Such intermediary devices may, for example, be operated/owned by a different party to the owner/operator(s) of the network controller 2 and/or end nodes 4, 5, 6, 7.

The network controller 2 may be capable of communicating with further devices on other networks (not shown), e.g. through a router to communicate via the internet, Wi-Fi, Bluetooth® and so on.

The end nodes need not communicate with the network controller 2 via only a single gateway 9. Rather, messages from end nodes 4, 5, 6, 7 may be sent via any one or more gateways 9 of the LPWAN 1 to the network server 8 and (thereafter to the) network controller 2. The network server 8 and/or the network controller 2 may be adapted to handle any duplicated messages received from a plurality of gateways. In other embodiments, the network controller 2 communicates directly with the end nodes 4, 5, 6, 7, i.e. there are no intermediary devices.

In this way, the network controller 2 can communicate with the end nodes, and is able to manage the end nodes. Preferably, each end node 4, 5, 6, 7 in at least the group 3 of end nodes is managed in a same or similar manner as other end nodes in the group of end nodes.

Purely by way of example, each end node 4, 5, 6, 7 may be a controllable luminaire, and the network controller 2 may be a user-controllable hub for controlling output characteristics of the luminaires. Messages from the end node to the network controller may include, for example, regular status updates (e.g. detailing current output characteristics, such as a current intensity/color/temperature of light), responses to enquiries or acknowledgment of commands. Messages from the network controller to the end nodes may include commands for controlling output characteristics or requesting certain information.

Communications within the LPWAN are conducted using a known LPWAN wireless communication standard or LPWAN communication protocol, such as LoRaWAN or ETSI's Low Throughput Networks (LTN).

Proposed methods relate to a concept of communicating with a target node of the LPWAN 1, such as one of the end nodes 4, 5, 6 7. Such a concept may be employed, for example, by the network controller 2 to control its communications with any of the end nodes 4, 5, 6, 7. Of course, other nodes of the LPWAN may use the proposed concept to advantage, e.g. to control communications between different end nodes, network servers 8, gateways 9 and/or network controllers 2. Thus, any element of the LPWAN can act as the target node, and any element able to communicate with an element of the LPWAN (including devices external to the LPWAN) can act as a communication unit (being the unit/module/device that performs the herein described method of communicating with the target node).

In particular, proposed methods may be performed by devices external to the LPWAN (e.g. communicating via the network controller) for communicating with a node of the LPWAN. Such embodiments may extend to other wireless networks than a LPWAN.

However, for the sake of clarity, hereafter described examples will relate to methods for controlling a communication between the network controller 2 (an example of a "communication unit") and an end node 4 (an example of a "target node") of the LPWAN 1.

An "uplink message" is a message that is sent from the target node (e.g. where the target node is an end node of a LPWAN: a communication from the end node to the network controller). A "downlink message" is a message that is sent to the target node (e.g. where the target node is an end node of a LPWAN: a communication from the network controller to the end node). The term "message" is used to refer to any instance of communication between nodes of a wireless network, and may be formed of a single packet.

As previously discussed, there is a desire to reduce a power consumption in wireless networks (and especially LPWANs). One way of achieving this is to limit a rate of communications between nodes of the wireless network, and in particular to communications from end nodes.

This can be achieved, for example, by limiting some nodes to only being capable of sending communications at periodic intervals or limiting a duty cycle of communications sent by said nodes. There are other reasons for limiting a duty cycle of communications, for example, to give other nodes and systems a chance to use a same channel or spectrum for communications. This is especially important in the unlicensed communications spectrum, and such duty cycle restrictions are commonly set in regulations or communication protocols/standards.

Such methods can effectively introduce a "recovery period" $t_r$ into the said node, being a period following sending of a communication or cumulative communications that the node is unable to send further communications. Thus, a recovery period indicates a length of time following sending of a message that a node during which the same node is unable to send a further message (in order to adhere to a particular communication protocol/standard or operating practice).

By way of example only, the LoRaWAN communication protocol limits the duty cycle of communications sent by a node of the LPWAN to 1% in the EU868 band. As, the data transmission rate of a LPWAN protocol is usually low, e.g. a typical data transmission rate of LoRaWAN is from 250 bps to 5470 bps in the EU868 band, this can result in the transmission time of a communication from a node taking between hundreds of milliseconds to more than one second. This would mean, in an example where the transmission time is 1 second, that the duty cycle restriction prevents a LoRaWAN node may not send two packets in 100 seconds. In some cases, such a restriction prevents a node from communicating for more than 36 seconds in one hour.

Thus, in an example where a "dynamic restriction mode" (previously described) is used, there is a recovery period of 99 seconds following the sending of a first communication by the node before a second communication can be sent.

In an example where a "moving window restriction mode" (previously described) is used, having a moving window 1 hour in length, there is a recovery period introduced after the sending of a message that causes more than 36 seconds of cumulative transmission time by that node within a preceding 1 hour period. The recovery time represents the length of time until a time point at which, for the hour preceding that time point, there is less than 36 seconds of cumulative transmission time.

By way of another example, not involving duty cycle restrictions, a communication protocol may restrict certain nodes (e.g. end nodes) to only being able to communicate at periodic intervals (e.g. every hour, every minute and so on). Thus, there may be a recovery period after sending a first communication before a second communication can be sent by that same node.

By way of yet another example, a communication protocol may restrict a data usage of certain/target nodes, preventing them from sending more than a certain amount of data within a predetermined time period, i.e. defines a data usage limit. Thus, after sending a large message or packet (or series of packages cumulatively exceeding the data usage limit), a target node may be unable to send communications until a recovery period has elapsed.

The recovery period of a node introduces difficulties if a downlink message, such as a downlink command, to that node requires an acknowledgement or response. This is because senders of such downlink messages typically set a timeout period $t_{to}$ for the response, after which the downlink message will be resent. The purpose of such a timeout period is to ensure that a target node receives a downlink message, e.g. as is common in handshake protocols. It is herein recognized that if the timeout period expires before the end of the recovery period, this could result in an unnecessary additional message(s) being sent to the node (having the recovery period) even though the earlier downlink message has been successfully received. This would disadvantageously increase traffic on the network.

Figure 2:
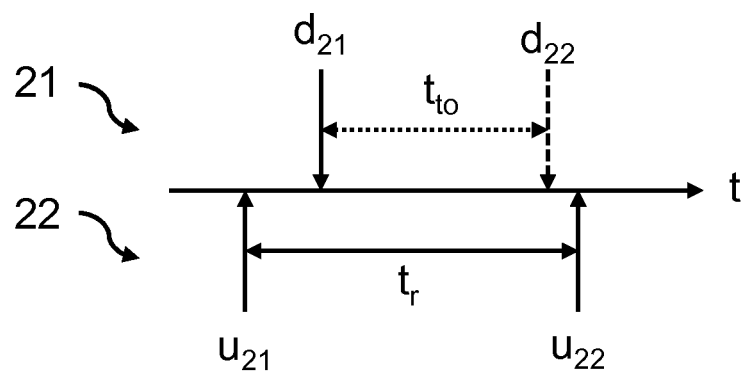
FIGS. 2 to 5 provide timing diagrams indicating communications between two nodes of a Low-Power Wide-Area Network.

An example of this issue can be understood with reference to FIG. 2. FIG. 2 provides a diagram illustrating communications between a network controller 21 and an end node 22 over a period of time t. In particular, FIG. 2 illustrates times at which example communications are sent by a network controller 21 (i.e. a downlink message) and an end node 22 (i.e. an uplink message).

The end node 22 is subject to communication restrictions, thereby having a recovery period $t_r$ after sending a message. The network controller 21 is adapted to resend a message, such as a command or instruction, to the end node 22 after a timeout period $t_{to}$ has elapsed in order to follow a handshake protocol.

The scenario illustrated in FIG. 2 is that the end node 22 has sent a first uplink message $u_{21}$ shortly before receiving a first downlink message $d_{21}$. As a result of the recovery period $t_r$ (earlier discussed), the end node 22 is unable to respond, i.e. with a response uplink message $u_{22}$, until the recovery period $t_r$ has elapsed.

It will be clear that in the event that the timeout period $t_{to}$ associated with the first downlink message $d_{21}$ expires before the time at which the recovery period $t_r$ has elapsed and a response uplink message $u_{21}$ is sent, as illustrated, this would result in a second downlink message $d_{22}$ (e.g. replicating the information of the first downlink message) being sent to the end node. Thus, unnecessary traffic has been added to the LPWAN (as the information will be unnecessarily resent to the end node).

The inventors have appreciated the need to appropriately set a timeout period to avoid unnecessary resending of a downlink message to a target node, whilst also avoiding excessively long timeout periods which would disrupt/delay communications. Without employing the method disclosed in this application, the timeout period would need to be set to an extremely long period of time (e.g. 150 seconds or the maximum possible length of the response period) to ensure that a target node is able to send a response to a downlink message before the timeout period elapses. This would result in significant communication delays and reduced communication certainty, and is not considered to be user friendly.

Of course, the skilled person would also appreciate the benefit of determining the timeout period without necessitating the resending of a downlink message. This could be done, for example, to monitor traffic on the network or to control sending of additional downlink messages to a target node (e.g. if a series of downlink messages is to be sent).

Figure 3:
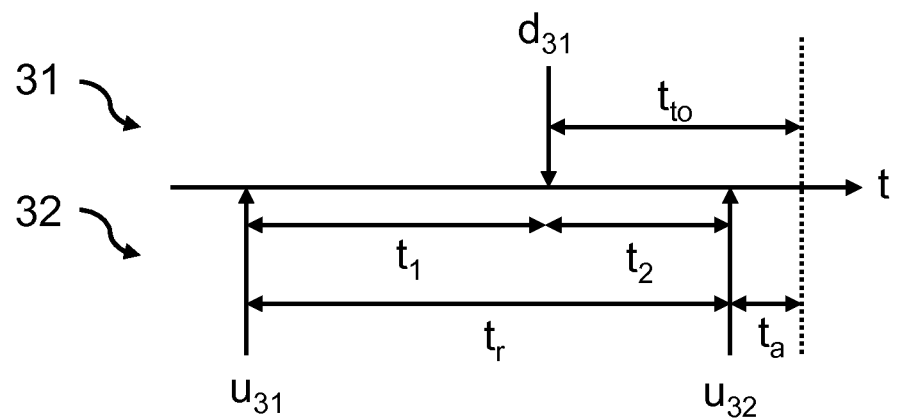

FIG. 3 illustrates a timing diagram illustrating communications between a network controller 31 and a target node 32 over a period of time t according to an embodiment of the invention.

The length of the timeout period $t_{to}$, associated with a downlink message $d_{31}$ sent to the target node 32, is determined based on characteristics of only a most recent (to the downlink message $d_{31}$) uplink message $u_{31}$ sent by the target node 32. In particular, a minimum length of the timeout period $t_{to}$ is based on or determined using characteristics of the uplink message $u_{31}$, which minimum length may then be used to set or determine the length of the timeout period $t_{to}$. It has been herein recognized that characteristics of the most recent uplink message $u_{31}$ can (depending upon the operating practice or communication protocol) define a length of the overall recovery period $t_r$.

The timeout period $t_{to}$ may be determined by calculating the recovery period $t_r$, determining how much of the recovery period $t_r$ has elapsed at the time of sending the downlink message $d_{31}$ (i.e. determining a length of an expired period $t_1$), and determining a minimum length of the timeout period $t_{to}$ based on (e.g. equal to) the remaining time of the recovery period (i.e. determining a length of an unexpired period $t_2$).

The expired period $t_1$ can also be called the offset time period, being the length of time between the sending of the uplink message and the sending of the downlink message.

In preferable embodiments, an additional length of time $t_a$, e.g. representing a delay for preparing and/or sending a communication from the target node 32 to the network controller 31, may be added to the length of the unexpired interval $t_2$ in order to calculate the minimum length of the timeout period. Delays may be caused, for example, by the routing of the response uplink message sent by the target node or by buffers in the LPWAN. Thus, there may be a delay between sending of the response uplink message $u_{32}$ and it being received by the network controller 31.

Adding the additional length of time $t_a$ onto the length of the unexpired period $t_2$ more accurately determines a length of time taken for a response uplink signal $u_{32}$ to be generated and sent by the target node (taking into account communicative restrictions) and to propagate through the network. This further avoids a likely that the downlink message will be resent unnecessarily.

The length of the additional length of time may be set, for example, to the length of a minimum round-trip time, later described. In other examples, the length of the additional length of time may be based on a difference between a time at which the first uplink message $u_{31}$ was sent (e.g. as contained in a timestamp accompanying the first uplink message) and a time at which the first uplink message was actually received. Other suitable methods of establishing a suitable additional length of time will be apparent to the skilled person (e.g. by consulting literature for the network or from known operating practices).

Thus, timing information of both the uplink message $u_{31}$ and the downlink message $d_{31}$ may be used to calculate how much $t_1$ of the recovery period $t_2$ has elapsed at the time of sending the downlink message $d_{31}$, thereby calculating an expired period $t_1$ and an unexpired period $t_2$ of the recovery period $t_r$. The minimum length of the timeout period $t_{to}$ is set to be no less than the unexpired period of the recovery period $t_r$.

In particular examples, the minimum length of the timeout period $t_{to}$ is set to be equal to the length of the unexpired period of the recovery period $t_r$ plus an additional length of time $t_a$ representing at least a length of a delay for the response uplink message $u_{32}$ to propagate through the network (i.e. representing latency).

A first method of determining the length of the recovery period $t_r$ could be to use information on the data size of the uplink message $u_{31}$, a known data transmission rate or bandwidth (e.g. in bits per second) of the LPWAN and a duty cycle restriction of the LPWAN (e.g. according to an operating practice or LPWAN communication protocol). In particular, a transmission time of the uplink message and a duty cycle restriction can be used to calculate the recovery period.

A transmission time of the uplink message $u_{31}$ can be readily calculated using the data transmission rate and the data size of the uplink message $u_{31}$. For example, if the data size of the uplink message $u_{31}$ is 40 bytes, and the data transmission rate is 250 bps (250 bits per second), the transmission time of the uplink message $u_{31}$ is 1.28 seconds (40*8/250). Here, the value 8 represents a conversion from bytes to bits.

The calculated transmission time and the duty cycle restriction can then be processed to determine the length of the recovery period $t_r$. For example, assuming a "dynamic restriction" approach is taken for restricting a duty cycle of the target node 32, if the transmission time is 1.28 seconds, and the duty cycle restriction is 1% (i.e. signals from the node can only be on the air, on average, 1% of the time), the length of the recovery period $t_r$ is approximately 128 seconds.

A second method of determining the length of the recovery period $t_r$ could be to determine a length of time between allowable periodic communications of the target node. For example, some communication protocols may restrict communications from certain nodes (such as end nodes) to only being periodic or at regular intervals. The length of the recovery period $t_r$ may be set to the length of the periodic interval.

A third method of determining the length of a recovery period $t_r$ could be to determine a length of the recovery period based only on a data size of the first uplink message. For example, there may be a known relationship between data size and length of a recovery period, which relationship may depend upon the communication protocol of the LPWAN (e.g. setting data limits).

It will be appreciated that the method used to calculate the recovery period may depend upon the operating practice or communication protocol of the LPWAN, and may therefore differ in different implementations of the concept.

However, it is particularly advantageous to use embodiments in which at least a duty cycle restriction of the LPWAN is taken into account. Such embodiments are advantageous as the duty cycle restriction tends to vary between different locations (e.g. the EU may have a different duty cycle restriction to the US) and between different frequency bands (e.g. 10% in a 869.4-869.65 MHz frequency band and 1% in a 868.0-868.6 MHz frequency band according to the regulation of ETSI), and it would be advantageous to use an adaptable method for different scenarios. It is considered that one particularly innovative aspect of this invention is the use of a duty cycle restriction to calculate a recovery period.

Preferably, the minimum length of the timeout period is further based or determined using a minimum round-trip time. The minimum round-trip time represents a minimum length of time for the downlink message to be sent to the target node, for the target node to process the downlink message and for the response uplink message to be returned to the sender of the downlink message. Thus, the minimum round-trip time represents a 'normal' length of a message and response cycle (assuming that the target node has no restrictions on its communications).

The minimum round-trip time may be calculated, for example, by determining a difference between a timestamp of sending a downlink message to a target node to a timestamp of receiving a response uplink message (to the downlink message) from the target node, when it is known that the target node is able to communicate freely (i.e. it is not in a recovery period). Such a state of the target node could be achieved by first instructing the target node to not send any communications for a predetermined period of time, such as a maximum possible recovery period.

In particular examples, if the recovery period has expired (or the time left to the end of the recovery period is less than the minimum round-trip time), the minimum length of the timeout period is set to no less than the minimum round-trip time. The minimum round-trip time may therefore represent an absolute minimum value of the timeout period.

In other words, the minimum length of the timeout period may be set to the greater of the minimum round-trip time and the unexpired period $t_2$ of the recovery period $t_r$.

A length of the timeout period is set to be no less than the determined minimum length of the timeout period. For example, the length of the timeout period may be set to be equal to the determined minimum length of the timeout period.

In other examples, e.g. to introduce a margin for error or unexpected communicative delay, a length of the timeout period may be calculated using the determined minimum length. In one example, a predetermined period of time (e.g. 500 ms, 1 second or 5 seconds or the minimum round trip time) may be added onto the determined minimum length to calculate the length of the timeout period. In another example, the determined minimum length is multiplied by a predetermined value (e.g. any value between 1 and 2, such as 1.1 or 1.5) to calculate the length of the timeout period.

Other methods of calculating an appropriate length of the timeout period, based on the determined minimum length of the timeout period, will be readily apparent to the skilled person. Thus, the length of the timeout period is based on the minimum length of the timeout period.

In some simpler embodiments, calculation of the expired and/or unexpired period of the recovery period is omitted, and the minimum value for the timeout period can be set based solely on the length of the recovery period. For example, the timeout period may be set to be equal to the length of the calculated recovery period or the recovery period plus an additional length of time $t_a$ representing at least a length of a delay for the response uplink message to propagate through the network (i.e. representing latency), which may be approximated using the minimum round trip time.

Thus, in some embodiments, calculation of the recovery period forms the determination of the minimum length of the timeout period. Such embodiments may minimize a processing power required to calculate the timeout period, at the expense of having a potentially longer timeout period (i.e. and increasing communication delay and communication certainty).

In some embodiments, a method may be adapted to recalculate the timeout period based on one or more characteristics of a second uplink message, if that second uplink response is received during the timeout period $t_{to}$ and does not correspond to the response uplink message. Thus, the timeout period may be effectively reset if a second uplink message is received after sending of a downlink message (assuming the second uplink message is not a response to the downlink message).

One such embodiment is illustrated in FIG. 4, which is a diagram again illustrating communications between a network controller 41 and a target node 42 over a period of time t according to an embodiment of the invention.

Figure 4:
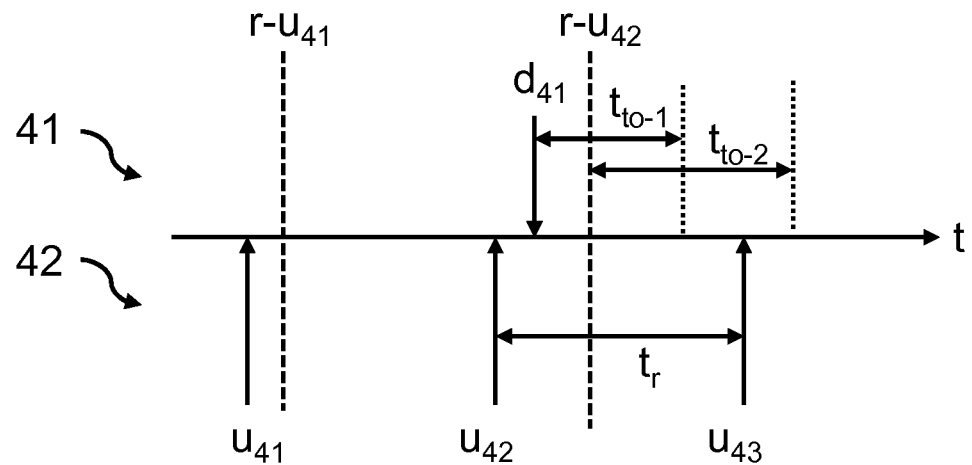

In particular, FIG. 4 illustrates times at which the target node 42 sends uplink messages to the network controller 41 and times at which the network controller sends downlink messages to the target node. For the sake of improved clarity, FIG. 4 also illustrates time at which uplink messages are received by the network controller (having reference numerals with the prefix r-u).

In the illustrated scenario, the target node sends a first uplink message $u_{41}$ and a second uplink message $u_{42}$ successively. The network controller 42 sends a downlink message $d_{41}$ after the first uplink message $u_{41}$ is received (at a first time $r\text{-}u_{41}$), but before the second uplink message $u_{42}$ is received (at a second time $r\text{-}u_{42}$).

Initially, the timeout period $t_{to\_1}$, based on one or more characteristics of the first uplink message $u_{41}$, using a method previously described (e.g. when the target node 42 is operating in the "dynamic restriction" mode). This is because the network controller is unaware of the second uplink message $u_{42}$, as it has not yet been received.

Subsequently during the timeout period $t_{to\_1}$, the second uplink message $u_{42}$ is received. In accordance with the embodiment, the timeout period is then recalculated, to form new timeout period $t_{to\_2}$, based on one or more characteristics of the second uplink message $u_{42}$. Previously described methods of calculating a timeout period may be used. Without the step of re-calculating the timeout period $t_{to\_2}$, a response uplink message $u_{43}$ would be received after the initial timeout period $t_{to-1}$ (calculated based on the first uplink message $u_{41}$) has expired, because there would be a recovery period $t_r$ following the sending of the second uplink message $u_{42}$. This could disadvantageously lead to the downlink message $d_{41}$ being resent unnecessarily, as the downlink message $d_{41}$ may have been successfully received by the target node 42.

Thus, by recalculating or resetting the timeout period based on one or more characteristics of a second uplink message $u_{42}$ (received during the initial timeout period $t_{to\_1}$) avoidance of unnecessary resending of the downlink message can be achieved.

It should be clear that the second uplink message $u_{42}$ must be distinguished from a response uplink message $u_{43}$ in that the second uplink message $u_{42}$ is not sent in response to the downlink message $d_{41}$. Typically, this would mean that the second uplink message $u_{42}$ was sent by the target node before the downlink message $d_{41}$ was sent by the network controller and/or received by the target node.

Figure 5:
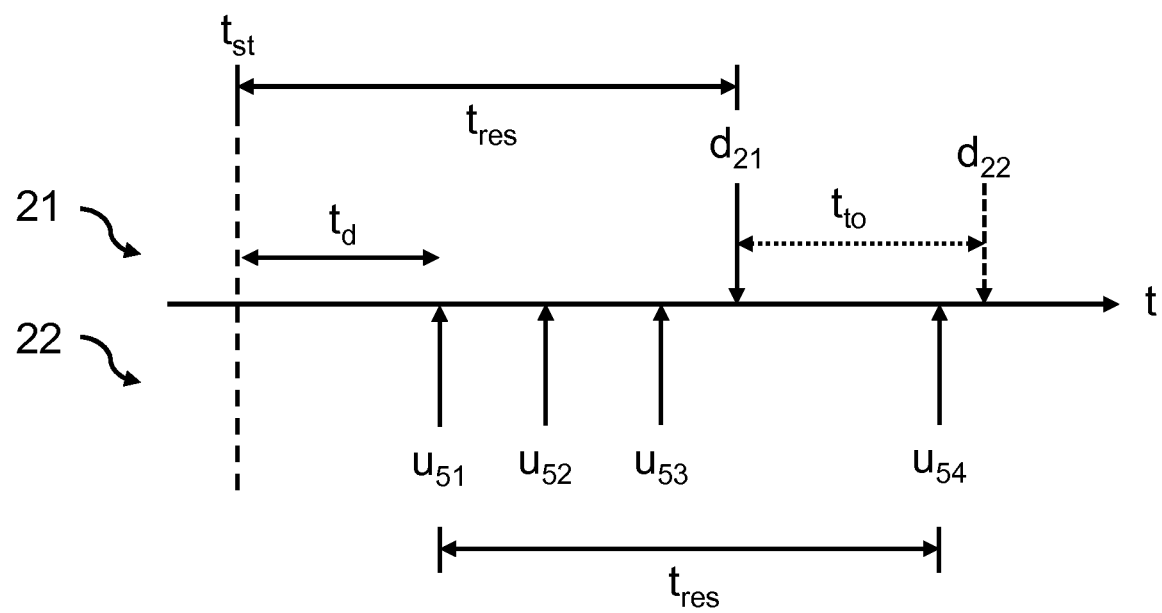

FIG. 5 illustrates a timing diagram illustrating communications between a network controller 51 and a target node 52 over a period of time t according to another embodiment of the invention.

In this embodiment, the target node 52 has a restricted duty cycle that operates in a "moving window restriction" mode, as compared to the "dynamic restriction" mode used in FIGS. 3 and 4.

Thus, the target node 52 is unable to send communications that would lead to a combined transmission time (within an immediately preceding predetermined period at any time point) being greater than a maximum combined transmission time. For example, where the restricted duty cycle is 1% and the predetermined period is 1 hour, the maximum combined transmission time is 36 seconds.

The minimum timeout period can be calculated using the following method.

The total (i.e. cumulative or combined) transmission time of all uplink messages $u_{51}$, $u_{52}$, $u_{53}$ sent by the target node 22 in a predetermined period $t_{res}$ (e.g. 1 hour) before the sending of the downlink message $d_{21}$ is calculated. The transmission time of each uplink message may be calculated using any previously described method (e.g. using the data size of each uplink message and the data transmission rate of the network).

If the total transmission time is less than the maximum combined transmission time, then the minimum timeout period can be set to be equal to zero or a minimum round-trip time (previously described). This is because the target node can immediately send a communication without contravening the duty cycle restriction.

If the total transmission time is greater than or equal to the maximum combined transmission time, then the minimum timeout period is set so that, at the expiry of the minimum timeout period from a current point in time, the combined transmission time in a predetermined period immediately preceding the expiry of the timeout period is less than the maximum combined timeout period. This may be performed, for example, by setting the minimum timeout period to being no less than a difference $t_d$ between a start time $t_{st}$ of the predetermined period $t_{res}$ (relative to the downlink message) and the time at which the earliest first uplink message $u_{51}$ (within the predetermined period $t_{res}$) was sent. Thus, the difference $t_d$ can be considered to represent an unexpired length of a recovery period.

The timeout period may be determined from the minimum timeout period using any previously described method (e.g. adding an additional length of time).

The embodiment described with reference to FIG. 5 demonstrates how the characteristics (e.g. time of sending and data size) of more than one first uplink message sent previous to the downlink message can be taken into account when determining the length of the recovery period $t_r$ and/or the timeout period $t_{to}$.

The skilled person will appreciate that the embodiment described with reference to FIG. 5 can be easily adapted to recalculate a new timeout period based on one or more characteristics of second uplink message received after sending of the downlink message. For example, a total transmission time may be calculated further using characteristics of the second uplink message.

As previously discussed, embodiments have been described in the context of a network controller sending a downlink message to an end node (acting as the target node).

However embodiments may be adapted to replace the network controller with any other component of the wireless network (or other connected network) capable of sending a downlink message to a component of the wireless network, and to replace the end node with any other component of the wireless network capable of sending an uplink message to another component of the wireless network or other connected network.

Embodiments of described methods have been described with reference to timing diagrams. Nonetheless, for the sake of clarity, a full flow chart illustrating a method according an embodiment is shown in FIG. 6.

Figure 6:
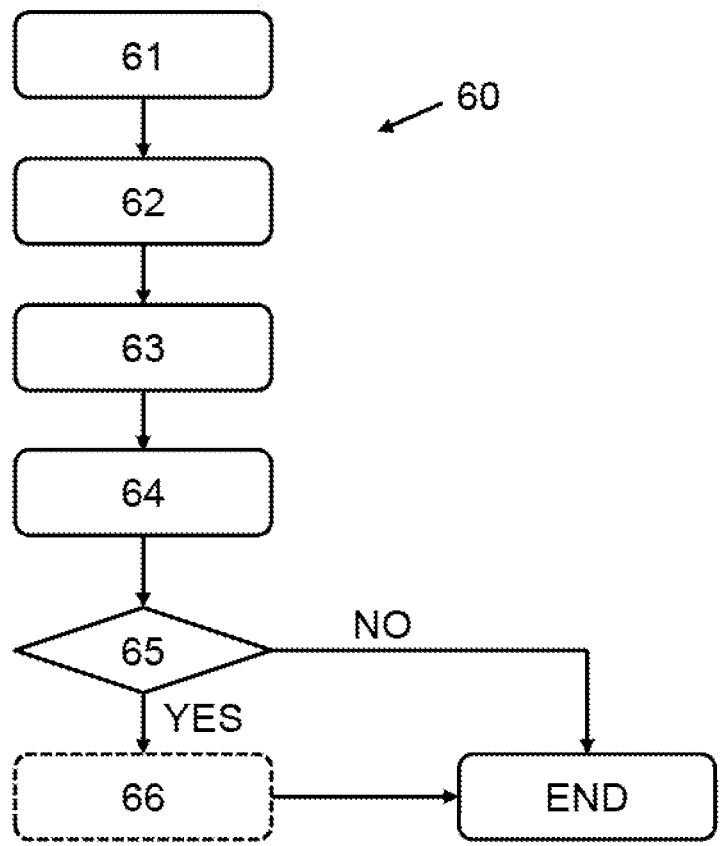
FIG. 6 illustrates a method according to an embodiment.

FIG. 6 thus illustrates a method 60 of communicating with a target node of a wireless network, such as a Low-Power Wide-Area Network, LPWAN.

The method comprises a step 61 of receiving at least one first uplink message sent by the target node. The method also comprise a step 62 of subsequently sending a downlink message to the target node, so that the downlink message is sent after the at least one first uplink message is received (but not necessarily in response thereto).

It should be made clear that the first uplink message includes at least the most immediately preceding uplink message (in time) that was received before the downlink message was sent. Thus, the first uplink message includes at least the temporally closest uplink message that was received before the downlink message was sent.

The method also comprises a step 63 of calculating a minimum timeout period using at least one characteristic of the at least one first uplink message, the minimum timeout period representing a minimum length of time following the sending of the downlink message during which the target node is expected to respond with a response uplink message. There is also a step 64 of determining a timeout period based on the minimum timeout period.

The method also comprises a step 65 of determining whether the target node has responded to the downlink message with a response uplink message within the timeout period following the sending of the downlink message.

In some examples, in response to the target node failing to respond to the downlink message with a response uplink message within the timeout period, the method comprises a step 66 of resending the downlink message to the target node. The method can then ends in a step END. In embodiments, in response to the target node responding with a response uplink message within the timeout period, the method could also then end in step END. However, step 66 is optional, and may be omitted, as there may be other purposes for determining the timeout period.

The timeout period is no less than a minimum timeout period calculated using at least one characteristic of at least one first uplink message sent by the target node.

In at least one example, the length of the timeout period is displayed or otherwise provided to a user. In particular examples, the remaining and/or elapsed time of the timeout period is displayed otherwise provided to a user. This may be performed using any audio, visual or haptic/sensory feedback system, such as a screen/display, speaker or vibration system.

The skilled person would be readily capable of developing a communication unit for carrying out a described method. Thus, each step of the flow chart may represent a different action performed by a communication unit, and may be performed by different modules of the communication unit.

Figure 7:
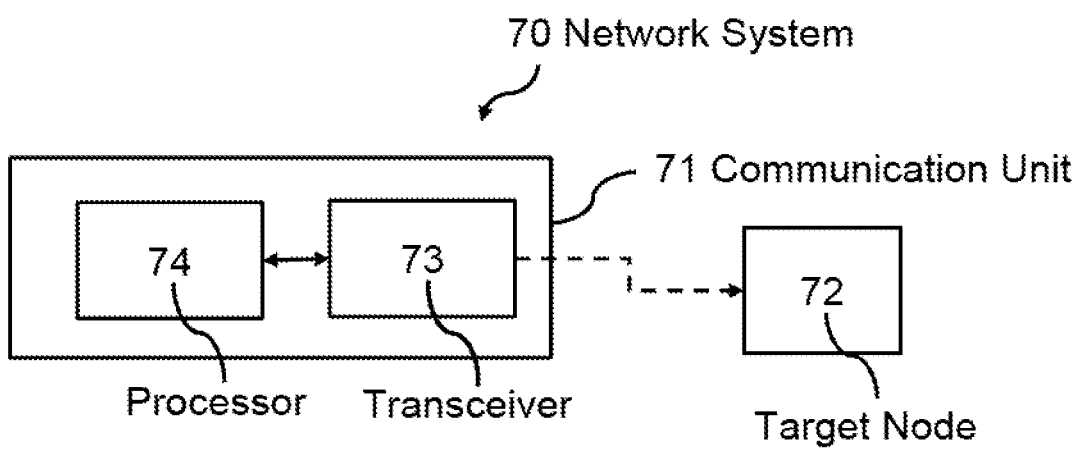
FIG. 7 illustrates a communication unit according to an embodiment.

FIG. 7 illustrates a network system 70 according to an embodiment of the invention. The network system 70 comprises a communication unit 71 according to an embodiment. The communication unit is adapted for communicating with a target node 72 of a wireless network, such as a Low-Power Wide-Area Network, LPWAN.

In particular, the communication unit comprises a transceiver 73 adapted to send signals to and receive signals from the target node 72. This may be performed, for example, using a wireless network such as that described in FIG. 1. Thus, the communication unit may, for example, act as a network controller.

The communication unit 71 also comprises a processor 74 adapted to communicate with the transceiver 73 in order to receive a first uplink message sent by the target node 72; subsequently send a downlink message to the target node; calculate a minimum timeout period using at least one characteristic of the at least one first uplink message, the minimum timeout period representing a minimum length of time following the sending of the downlink message during which the target node is expected to respond with a response uplink message; determine a timeout period based on the minimum timeout period; and determine whether the target node has responded to the downlink message with a response uplink message within the timeout period following the sending of the downlink message.

Preferably, the minimum timeout period is calculated using timing information and/or a data size of at least one the first uplink message. Preferably, the minimum timeout period is calculated further using a duty cycle restriction of the wireless network or target node.

The communication unit 71 may further comprise a display (not shown) adapted to provide a user with an indication of the timeout period and/or a remaining/elapsed time of the timeout period. This improves a user's understanding of the timeout period.

The target node 72 is adapted to send the first uplink message to the communication unit 71; receive the downlink message from the communication unit; and send a response uplink message to the communication unit in response to the downlink message, wherein the timing of sending the response uplink message to the communication unit is based on at least one characteristics of the first uplink message.

Although only one target node is illustrated and described, embodiments may comprise more than one target node.

In preferable embodiments, a target node is a luminaire or light source adapted to be controllable by downlink messages, which preferably forms an end node. In particular, downlink messages may define output characteristics of the luminaire or light source, such as a light output intensity, color, temperature, angle, spread, direction or duration.

Preferably, the target node is a battery powered devices, resource-restricted unit, or power-harvesting device, such as a solar-powered devices. Such devices benefit from power saving practices, such as having restricted communications (e.g. limited duty cycle transmissions).

Preferably, a communication unit may be installed in a network controller or other device adapted to control an operation of at least one target node in a wireless network. Examples of suitable network controllers or other devices include a wall switch; a touch panel; a remote control; and an occupancy sensor. Such embodiments are particularly advantageous when the target or end nodes comprise luminaires or light sources.

In embodiments, a target node may be an input/output unit, which is preferably an end node. Generally, the term "input/output unit" indicates that the unit is adapted to output sensory or control information externally to the target node (e.g. output light, sound, touch etc. or control a pacemaker, medicinal drip etc.) and/or determine information about the node or its immediate environment (e.g. temperature, ambient light, power usage, presence of certain gases, water flow/usage, electricity flow/usage, pulse rate of a user and so on). Thus, the input/output unit may, for example, comprise a water/electricity meter, a temperature sensor, a moisture sensor, a gas sensor, a pulse rate monitor and so on.

As discussed above, embodiments make use of a processor. The processor be implemented in numerous ways, with software and/or hardware, to perform the various functions required. A processor is one such example which employs one or more microprocessors that may be programmed using software (e.g., microcode) to perform the required functions. A processor may however be implemented with or without employing a processor, and also may be implemented as a combination of dedicated hardware to perform some functions and a processor (e.g., one or more programmed microprocessors and associated circuitry) to perform other functions.

Examples of processor components that may be employed in various embodiments of the present disclosure include, but are not limited to, conventional microprocessors, application specific integrated circuits (ASICs), and field-programmable gate arrays (FPGAs).

In various implementations, a processor may be associated with one or more storage media such as volatile and non-volatile computer memory such as RAM, PROM, EPROM, and EEPROM. The storage media may be encoded with one or more programs that, when executed on a computer, one or more processors and/or a processing arrangement, perform the required functions. Various storage media may be fixed within a processor or may be transportable, such that the one or more programs stored thereon can be loaded into a processor.

It will be understood that disclosed methods are preferably computer-implemented methods. As such, there is also proposed the concept of computer program comprising code means for implementing any described when said program is run on a computer. Thus, different portions, lines or blocks of code according to an embodiment may be executed by a processor/computer to perform a herein described methods.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The term "at least one of the following" means any combination of features following this term, e.g. "at least one of the following: A, B and C" would mean "A and/or B and/or C". A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of communicating with a target node of a wireless network, the method comprising:

receiving at least one first uplink message sent by the target node;

subsequently sending a downlink message to the target node;

calculating a minimum timeout period using at least one characteristic of the at least one first uplink message, the minimum timeout period representing a minimum length of time following the sending of the downlink message during which the target node is expected to respond with a response uplink message;

determining a timeout period based on the minimum timeout period; and determining whether the target node has responded to the downlink message with a response uplink message within the timeout period following the sending of the downlink message.

2. The method of claim 1, wherein each at least one characteristic comprises timing information, a data size and/or a transmission time of a first uplink message.

3. The method of claim 1, wherein the minimum timeout period is calculated further using timing information of the downlink message.

4. The method 1, wherein the minimum timeout period is calculated further using a duty cycle restriction of the wireless network or target node.

5. The method of claim 4, wherein the at least one characteristic comprises timing information and a transmission time of each at least one first uplink message, and the step of calculating the minimum timeout period comprises:

calculating, based on the duty cycle restriction and the at least one characteristic of the at least one first uplink message, a length of time before the target node is able to send an uplink message; and determining the minimum timeout period based on the calculated length of time before the target node is able to send a communication.

6. The method of claim 1, wherein the step of calculating the minimum timeout period comprises:

determining a length of a recovery period, following a most recent first uplink message, during which the target node is not permitted to issue a subsequent uplink message in accordance with an operating practice; and determining the minimum timeout period based on the length of the recovery period.

7. The method of claim 6, wherein the step of calculating the minimum timeout period comprises:

determining the length of an offset time period, being the length of time between the sending of the most recent uplink and the sending of the downlink message;

calculating the minimum timeout period based on the offset time period and the recovery period.

8. The method of claim 6, wherein the step of determining a length of a recovery period comprises:

determining a data size of the most recent uplink message;

determining a data transmission rate of the wireless network;

determining a maximum allowable duty cycle of the wireless network or target device according to the operating practice; and determining the length of the recovery period based on the data size of the most recent first uplink message, the data transmission rate of the wireless network and the maximum allowable duty cycle of the wireless network.

9. The method of claim 8, wherein the step of determining the length of the recovery period comprises:

determining the transmission time of the most recent first uplink message, being the length of time taken by the target node to send the most recent first uplink message, based on the size of the most recent first uplink message and the data transmission rate; and calculating the length of the recovery period based on the transmission time and the maximum allowable duty cycle.

10. The method of claim 1, wherein the minimum timeout period is further based on a minimum round-trip time representing a minimum length of time taken, subsequent to the sending of a downlink message, to receive a response uplink message.

11. The method of claim 1, further comprising, in response to receiving a second uplink message, different to the response uplink message, from the target node after sending the downlink message and before receiving the response uplink message, recalculating the minimum timeout period using at least one characteristic of the second uplink message.

12. The method of claim 1, further comprising, in response to the target node failing to respond to the downlink message with a response uplink message within the timeout period, resending the downlink message to the target node.

13. A non-transitory computer readable medium comprising code means for implementing the method of claim 1 when the code is executed by a computer.

14. A wireless network comprising:
the communication unit of claim 13; and
at least one target node adapted to:
send the first uplink message to the communication unit;
receive the downlink message from the communication unit;
send a response uplink message to the communication unit in response to the downlink message, wherein the timing of sending the response uplink message to the communication unit is based on at least one characteristic of the first uplink message.

15. A communication unit for communicating with a target node of a wireless network, the communication unit comprising:
a transceiver adapted to send signals to and receive signals from the target node;
a processor adapted to communicate with the transceiver in order to:
receive at least one first uplink message sent by the target node;
subsequently send a downlink message to the target node;
calculate a minimum timeout period using at least one characteristic of the at least one first uplink message, the minimum timeout period representing a minimum length of time following the sending of the downlink message during which the target node is expected to respond with a response uplink message;
determine a timeout period based on the minimum timeout period; and
determine whether the target node has responded to the downlink message with a response uplink message within the timeout period following the sending of the downlink message.

* * * * *